(12) United States Patent
Wolk et al.

(10) Patent No.: US 6,801,875 B1
(45) Date of Patent: Oct. 5, 2004

(54) METHODS, SYSTEMS, AND SOFTWARE FOR PERFORMING MEASUREMENTS

(75) Inventors: Jeffrey A. Wolk, Half Moon Bay, CA (US); Irina Kazakova, Palo Alto, CA (US); Morten J. Jensen, San Francisco, CA (US)

(73) Assignee: Caliper Life Sciences, Inc., Mountain View, CA (US)

( * ) Notice: Subject to any disclaimer, the term of this patent is extended or adjusted under 35 U.S.C. 154(b) by 219 days.

(21) Appl. No.: 10/124,738

(22) Filed: Apr. 17, 2002

Related U.S. Application Data (60) Provisional application No. 60/284,827, filed on Apr. 18, 2001.

(51) Int. Cl.[7] .................. G01B 11/02; G01B 11/14; G01B 13/02; G01B 21/02; G01B 5/02

(52) U.S. Cl. .................. 702/158; 702/142; 702/159; 250/575; 250/559.22; 250/559.24; 250/559.26; 250/559.29; 250/559.32; 250/215; 250/229; 348/139; 356/630; 356/635; 356/121; 356/600; 356/614; 356/5.09; 356/3.01; 382/106; 382/107; 345/97; 345/173; 385/52

(58) Field of Search .................. 702/142, 158, 702/159; 382/106, 107; 345/97, 173; 356/121, 630, 28, 635; 250/559.24, 2, 559.22, 215, 229, 575, 559.29, 559.32; 385/52; 347/234–235, 248, 250

(56) References Cited

U.S. PATENT DOCUMENTS

| | | | | |
|---|---|---|---|---|
| 4,251,733 A | * | 2/1981 | Hirleman, Jr. | 250/575 |
| 4,392,204 A | * | 7/1983 | Prim et al. | 700/227 |
| 4,867,556 A | * | 9/1989 | Bjorkman | 356/3.01 |
| 5,329,467 A | * | 7/1994 | Nagamune et al. | 702/159 |
| 5,376,805 A | * | 12/1994 | Nieminen et al. | 250/559.26 |
| 5,485,009 A | * | 1/1996 | Meyzonnetie et al. | 356/5.09 |
| 5,586,063 A | * | 12/1996 | Hardin et al. | 702/142 |
| 5,949,530 A | * | 9/1999 | Wetteborn | 356/5.01 |
| 5,986,761 A | * | 11/1999 | Crawforth et al. | 356/600 |
| 6,212,480 B1 | * | 4/2001 | Dunne | 702/159 |
| 6,323,953 B1 | * | 11/2001 | Blaesing-Bangert et al. | 356/614 |
| 6,483,536 B2 | * | 11/2002 | Aoyama | 348/139 |
| 2003/0015672 A1 | * | 1/2003 | Gallagher | 250/548 |
| 2003/0127610 A1 | * | 7/2003 | Gallagher | 250/574 |
| 2004/0022498 A1 | * | 2/2004 | Medberry et al. | 385/52 |

\* cited by examiner

Primary Examiner—John Barlow
Assistant Examiner—Aditya Bhat
(74) Attorney, Agent, or Firm—Donald R. McKenne (57) ABSTRACT

Methods of measuring widths of illumination spots and distances between two points, and predicting detected signal widths are provided. Systems, software, and kits for performing the methods of the invention are also provided.

31 Claims, 7 Drawing Sheets

---

A1

Pass an illumination spot across two points at a selected rate, where the distance between the two points is known, and where a detectable signal is created as the illumination spot is incident across each of the two points

↓

A2

Measure an amount of time for the illumination spot to move from a first of the two points to a second of the two points

↓

A3

Calculate the width of the illumination spot from the amount of time, the rate, and the distance between the two points

A1

Pass an illumination spot across two points at a selected rate, where the distance between the two points is known, and where a detectable signal is created as the illumination spot is incident across each of the two points

A2

Measure an amount of time for the illumination spot to move from a first of the two points to a second of the two points

A3

Calculate the width of the illumination spot from the amount of time, the rate, and the distance between the two points

Pass an illumination spot across two points at a selected rate, where the width of the illumination spot is known, and where a detectable signal is created as the illumination spot is incident across each of the two points

A2

Measure an amount of time for the illumination spot to move from a first of the two points to a second of the two points

A3

Calculate the distance between the two points from the amount of time, the rate, and the width of the illumination spot

METHODS, SYSTEMS, AND SOFTWARE FOR PERFORMING MEASUREMENTS

CROSS-REFERENCE TO RELATED APPLICATION

This application claims the benefit of U.S. Provisional Patent Application No. 60/284,827 filed Apr. 18, 2001, which is incorporated herein by reference in its entirety for all purposes.

COPYRIGHT NOTIFCATION

Pursuant to 37 C.F.R. § 1.71(e), Applicants note that a portion of this disclosure contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

BACKGROUND OF THE INVENTION

Accurate measurements of distances are often critical to the proper performance of a given process or to the quality of a given product. For example, the manufacture of microfabricated devices, such as integrated circuits, microprocessors, microfluidic components, among many others, can require very high levels of accuracy in all aspects of the fabrication process, including fabricated device dimensions, in order to reliably produce the assorted microscale features of these devices. Many non-microscale devices similarly must be efficiently manufactured with dimensions accurately produced according to specifications in order to achieve cost effectiveness.

In the context of microfluidics, for example, these devices generally provide high-throughput methods of performing diverse instrumental analyses, including various cell-based screening and separation assays of particular relevance to modern pharmaceutical discovery. Many of these assays generate detectable signals by passing fluorescently labeled cells through laser induced illumination spots incident within device cavities. Accurately measured illumination spot widths are important for interpreting data obtained from cell-based or other assays. Specifically, an improperly focused illumination spot having a width smaller than the cavity width at the point of incidence typically yields biased results, such as incorrect ratios of the number of labeled to unlabelled cells. Furthermore, knowledge of accurate illumination spot sizes allows the velocity of cells flowing through the cavity to be more easily calculated.

Accordingly, improved methods of measuring distances in microfluidic systems would be desirable. The present invention is directed to these and other features by providing methods of measuring widths of illumination spots as well as other distances. The invention also relates to systems and software for performing the methods of the invention. These and many other features will be apparent upon complete review of the following disclosure.

SUMMARY OF THE INVENTION

The present invention generally relates to measuring distances. In particular, the invention provides methods, and related systems, for measuring widths of illumination spots and distances between two points (e.g., between two detectable marker points), and for predicting detected signal widths. In preferred embodiments, measurements of various microscale cavity dimensions, including those of microfluidic devices are made according to the methods described herein. For example, illumination spot measurements are typically utilized to optimize various microfluidic applications, such as cellular-based assays, by focusing or defocusing illumination spots used for detection to correspond to cavity dimensions at the points of illumination spot incidence. Software products for performing the methods of the invention are also provided.

In one aspect, the invention relates to a method of measuring a width of an illumination spot. The method includes passing (e.g., manually, robotically, or the like) the illumination spot (e.g., generated by a laser, etc.) across two points at a rate, where a distance between the two points is known, and in which a detectable signal is created as the illumination spot is incident across each of the two points. In preferred embodiments, identical or different components of a microscale cavity (e.g., a microchannel, a capillary channel, a microscale reservoir, or the like) include the two points (e.g., two sides of a microchannel or the like). The method also includes measuring an amount of time for the illumination spot to move from a first of the two points to a second of the two points (e.g., through and between each of the two points), and calculating the width of the illumination spot from the amount of time, the rate, and the known distance between the two points (e.g., a width of a microchannel, etc.). The calculating step typically includes multiplying the rate and the amount of time to yield a detected signal width, and subtracting the distance between the two points from the detected signal width. The method generally further includes focusing or defocusing the illumination spot upon measuring the width of the illumination spot to correspond to about the distance between the two points. For example, the focused or defocused illumination spot is optionally utilized to optimize detection of an assay (e.g., a cell-based assay or the like) performed in a microfluidic device.

In another aspect, the invention provides a method of measuring a distance between two points, such as two sides of a microchannel (e.g., a width of a microchannel, etc.) or the like. The method includes passing (e.g., manually, robotically, or the like) an illumination spot (e.g., generated by a laser, etc.) across the two points at a rate, where a width of the illumination spot is known, and in which a detectable signal is created as the illumination spot is incident across each of the two points. In preferred embodiments, identical or different components of a microscale cavity (e.g., a microchannel, a capillary channel, a microscale reservoir, or the like) include the two points. The method also includes measuring an amount of time for the illumination spot to move from a first of the two points to a second of the two points, and calculating the distance between the two points from the amount of time, the rate, and the known width of the illumination spot. The calculating step typically includes multiplying the rate and the amount of time to yield a detected signal width, and subtracting the width of the illumination spot from the detected signal width.

In yet another aspect, the invention relates to a method of predicting a detected signal width expected upon detecting a detectable signal created as an illumination spot passes across two points, where a width of the illumination spot and a distance between the two points are known. The method includes summing the width of the illumination spot and the distance between the two points.

The present invention also provides a system that includes a computer and system software having one or more logic instructions for performing the methods described herein. In addition, the invention also relates to a software product that includes a computer readable medium having a computer program stored thereon for causing a computer to measure a width of an illumination spot or to measure a distance between two points.

DETAILED DISCUSSION OF THE INVENTION

I. Introduction

A variety of cell-based assays are of considerable commercial relevance in screening for modulators of cell-based activity. For example, compounds that affect cell death can have profound biological activities and are desirably screened for in cell-based assays. Cell death has become recognized as a physiological process important in normal development, hormonal regulation of various tissues, and, e.g., in regulation of the receptor repertoires of both T and B lymphocytes. The finding that a pattern of morphological changes is common to many examples of programmed cell death (or PCD) led to the suggestion of a common mechanism, and the term "apoptosis" was defined to include both the morphological features and the mechanism common to such programmed cell death (Kerr et al., *Br. J. Cancer* 26:239 (1972)). This concept was extended by the finding that nuclear DNA fragmentation correlates well with apoptotic morphology (Arends et al., *Am. J. Pathol.* 136:593 (1990)), and the scientific literature contains many examples of PCD accompanied by these features. There are also clear examples of PCD in the absence of apoptotic morphology or DNA fragmentation (Clarke, *Anat. Embryl.* 181:195 (1990), Martin et al, *J. Cell Biol.* 106:829 (1988), and Ishigami et al., *J. Immunol.* 148:360 (1992)).

Cell-based assay systems model relevant biological phenomena, and have generally been widely adopted as screening assays, e.g., when screening for a compound's effect(s) on apoptosis or other biological phenomena. Pioneering technology providing cell- and other particle-based microscale assays are set forth in, e.g., U.S. Pat. No. 5,942,443, entitled "High Throughput Screening Assay Systems in Microscale Fluidic Devices," issued Aug. 24, 1999 to Parce et al., WO 00/050172, entitled "Manipulation of Microparticles In Microfluidic Systems," filed Feb. 22, 2000 by Mehta et al., and WO 00/050642, entitled "Sequencing by Incorporation," filed Feb. 22, 2000 by Parce et al.

Other cell-based assays include various methods for the preparative or analytic sorting of different types of cells. For example, well-known sorting methods include those using fluorescence-activated cell sorters ("FACSs"). FACSs for use in sorting cells and certain subcellular components such as molecules of DNA have been proposed in, e.g., Fu, A. Y. et al. (1999) "A Microfabricated Fluorescence-Activated Cell Sorter," *Nat. Biotechnol.* 17:1109–1111, Unger, M., et al. (1999) "Single Molecule Fluorescence Observed with Mercury Lamp Illumination," *Biotechniques* 27:1008–1013, and Chou, H. P. et al. (1999) "A Microfabricated Device for Sizing and Sorting DNA Molecules," *Proc. Nat'l. Acad. Sci.* 96:11–13.

The methods and systems of the present invention are particularly applicable for optimizing the detection of, e.g., cell viability assays as well as for screening test compounds for their effects on cell viability. Such assays are generally utilized in performing toxicity studies, antibiotic screening methods, or the like, and are particularly suitable for the methods and systems of the present invention.

In operation, the suspension of cells typically includes a label. The cells are optionally treated with a second function labeling group that indicates the viability of the cells in the suspension. Specifically, the function label preferentially stains or labels either viable or non-viable cells. A variety of viability indicative dyes are generally commercially available. For example, fluorogenic esterase substrates, such as Calcein AM, BCECF AM and fluorescein diacetate, are optionally loaded into adherent or nonadherent cells, and are suitable indicators of cell viability. Specifically, these esterase substrates measure both esterase activity, which is required to activate the fluorescence of the dye, as well as cell-membrane integrity, which retains the fluorescent materials intracellularly. Other suitable viability indicators include polyfluorinated fluorescein derivatives (i.e., DFFDA, TFFDA, HFFDA and $Br_4TFFDA$), polar nucleic acid based dyes (i.e., SYTOX Green™), dimeric and monomeric cyanine dyes (i.e., TOTO™ and TO-PRO™ series dyes from Molecular Probes), ethidium and propidium dyes (i.e., ethidium bromide, ethidium homodimer and propidium iodide).

Depending upon the viability indicator used, the level of function label is indicative of the number of either viable or non-viable cells, while the level of reference label is indicative of the number of total cells, e.g., viable and non-viable. Comparison of the levels of the two labels then provides an indication of the relative viability of the cells in the suspension, regardless of the number of cells being detected, e.g., multiple cells, aggregates, or individual cells. In particular, where two cell populations show a similar level of reference label, but one population shows a lower level of viability indicator, it will be understood that the second population is less viable, e.g., has more nonviable cells. It will be appreciated that many dyes or labels described for use as reference labels are also often used as viability labels. Accordingly, it will generally be desirable to select a reference label that labels both viable and nonviable cellular material, and which is distinguishable from the function label. Examples of such reference labels include, e.g., lipophilic membrane labels, or the like.

In performing screening assays, cell suspensions that are exposed to different test compounds or agents are flowed past the detection point and the relative viability of the cells is determined, as compared to a control. Increases or decreases in cellular viability indicate that the compound or agent improves or decreases cellular viability. Such assays are readily employed in identifying antimicrobial, antibiotic or other viability affecting agents. Similarly, such assays are optionally employed in screening for effectors of pathways involved in apoptosis or programmed cell death, e.g., ras mediated pathways.

Although this disclosure primarily describes the methods, systems, and software of the invention in the context of microfluidic applications, it will be appreciated that the invention is optionally adapted to perform essentially any measurement, whether microscale or non-microscale in dimension. For example, in certain embodiments, the invention is optionally utilized, e.g., to assure quality following device manufacture, e.g., by verifying that specified device (e.g., cavity) dimensions have been fabricated or the like. In preferred embodiments, the methods, systems, and software of the present invention are used to optimize the performance of microfluidic assays, such as cell-based assays (e.g., cell viability screens, cell sorting, or the like).

The following provides details regarding various aspects of the methods of measuring widths of illumination spots and distances between two points, and for predicting detected signal widths. It also provides details pertaining to systems and software for performing the methods described herein.

II. Measurement Methods

The invention provides methods of measuring various distances. In preferred embodiments, the invention includes a method of measuring a width (e.g., a diameter or the like) of an illumination spot. As used herein, an "illumination spot" refers to a spot or location of illumination incident on a surface (e.g., a bottom or other portion of a microscale cavity, etc.) produced by an illumination source, such as a laser, an arc lamp, an incandescent filament lamp, or the like. Additional illumination sources are described below. A width of an illumination spot typically corresponds to a width of the photon beam that creates the spot. In other embodiments, the invention provides a method of measuring a distance between two points (e.g., any two detectable marker locations). In particular, both methods include passing (e.g., manually, robotically, or the like) the illumination spot across two points at a rate, in which a detectable signal is created as the illumination spot is incident across (and between) each of the two points.

In preferred embodiments, the measurements are made while passing an illumination spot across a microscale cavity (e.g., a microchannel, etc.) having a fluorescent dye disposed therein, which dye produces the detectable signal as the spot is incident between two opposing sides of the cavity (i.e., each side corresponds to one of the two points). For the method of measuring a width of an illumination spot, a distance between the two points is known, whereas for the method of measuring a distance between two points, a width of the illumination spot is known. For both methods, an illumination spot source is typically positioned at about a fixed distance from the two points during the passing step. In certain embodiments of both methods, the rate optionally includes, e.g., at least about 1 $\mu$m/second, at least about 5 $\mu$m/second, at least about 10 $\mu$m/second, at least about 15 $\mu$m/second, at least about 20 $\mu$m/second, at least about 25 $\mu$m/second, at least about 50 $\mu$m/second, or faster.

Essentially any two points are optionally used to measure an illumination spot width or to measure the distance between two points according to the methods described herein, e.g., so long as a detectable signal is produced as the illumination spot is incident across and between the two points. In preferred embodiments of both methods, identical or different components of a microscale cavity (e.g., a microchannel, a capillary channel, a microscale reservoir, or the like) include the two points. For example, the distance between the two points, which is known for the method of measuring an illumination spot width optionally includes, e.g., at least about 0.1 $\mu$m, at least about 1 $\mu$m, at least about 10 $\mu$m, at least about 15 $\mu$m, at least about 20 $\mu$m, at least about 25 $\mu$m, at least about 50 $\mu$m, at least about 100 $\mu$m, at least about 250 $\mu$m, at least about 500 $\mu$m, at least about 1000 $\mu$m, or more. A microfluidic device typically includes the microscale cavity. In addition, the components for both methods typically include, e.g., a side portion, a top portion, a bottom portion, or the like. To illustrate, one side portion of a microscale cavity optionally includes one of the two points, while an opposing side portion of the cavity includes the other point. Optionally, the two points are included in opposing top and bottom portions of a microscale cavity. As a further option, both points are included on the same component, e.g., on the same side portion, the same top portion, the same bottom portion, or the like.

Both methods also include measuring an amount of time for the illumination spot to move from a first of the two points to a second of the two points. The measuring step typically includes detecting the detectable signal and determining the amount of time from the detected signal (e.g., a recorded signal intensity or the like). In certain embodiments, for example, the amount of time corresponds to a signal intensity recorded between two signal minima through a signal maximum. The two signal minima typically correspond to the position of the illumination spot prior to being incident on the first point and after being incident on the second point, respectively. The signal maximum typically corresponds to a position of the spot incident entirely between the two points. The detecting step generally further includes excluding a background signal produced in an absence of the illumination spot. Suitable detectable signals for the methods of the present invention include essentially any change in the signaling characteristics received from a surface that comprises the detectable marker locations (i.e., the two points, such as opposing surfaces in a microchannel or the like). For example, the detectable signal optionally includes, a light emission, a change in light emission, an absorbance, a change in absorbance, a fluorescence, a change in fluorescence, a phosphorescence, a change in phosphorescence, a luminescence, a change in luminescence, a temperature, a change in temperature, an optical density, a change in optical density, a refractive index, refraction, diffraction, or the like. Optionally, the determining step further includes extrapolating at least a portion of the amount of time from the detected signal. In particular, the amount of time generally includes a period during which the detectable signal exceeds a background signal as the illumination spot passes across the two points.

Following the measuring step of the method of measuring a width of an illumination spot, the method includes calculating the width of the illumination spot from the amount of time, the rate, and the known distance between the two points. In particular, the calculating step typically includes multiplying the rate and the amount of time to yield a detected signal width (i.e., in a distance dimension), and subtracting the distance between the two points from the detected signal width. To illustrate, a change in fluorescent intensity is optionally detected as a laser illumination spot is incident across a microfluidic device channel having a fluorescent dye disposed in the channel. If the time during which the fluorescent intensity exceeds background (e.g., signal not produced by the dye) as the spot passes across the channel is 8 seconds (e.g., as ascertained from a recorded signal intensity graph or the like) and the rate of spot movement is 15 $\mu$m/second, then the corresponding signal width would be 120 $\mu$m (i.e., 8 seconds×15 $\mu$m/second).

Further, if the detectable signal was produced as the spot traversed across and between opposing sides of the channel (i.e., each side corresponded to one of the two points or detectable marker locations) that are 100 μm apart, then the illumination spot width would be 20 μm (i.e., 120 μm−100 μm).

Figure 8:
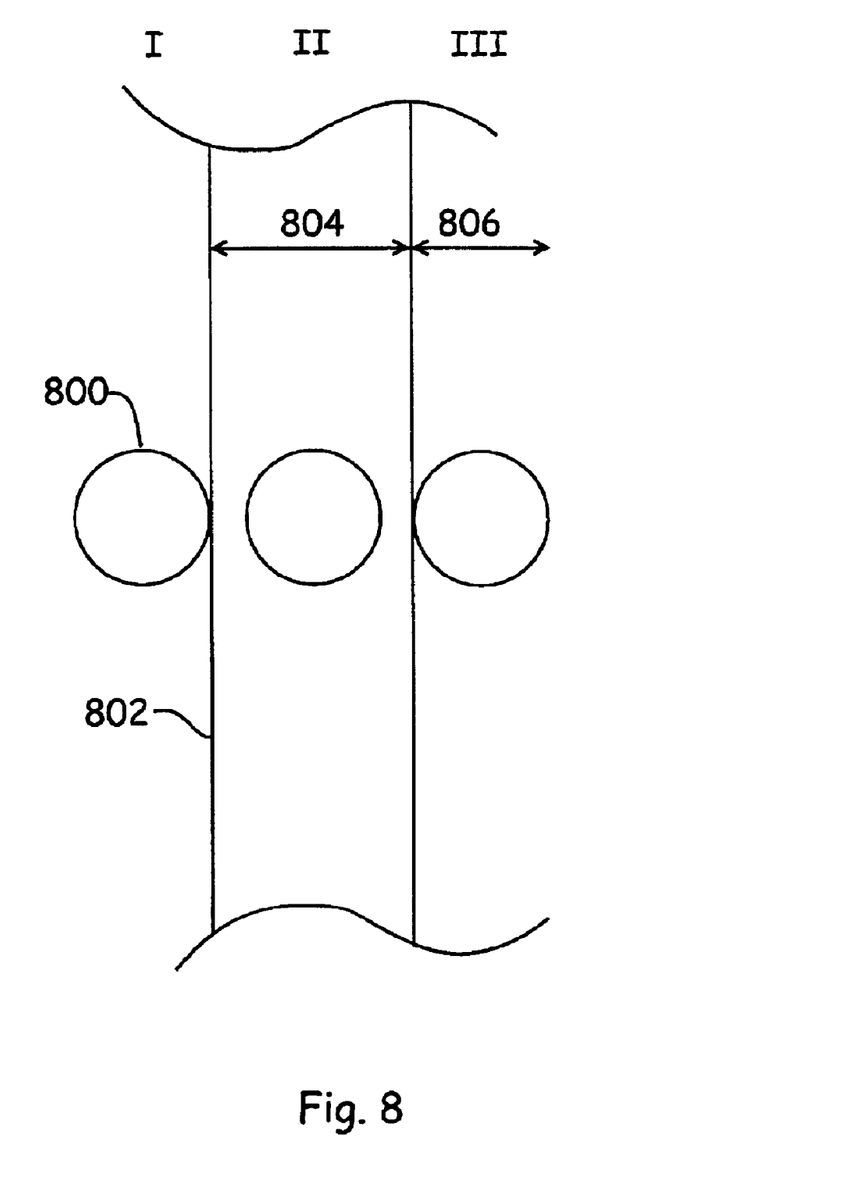
FIG. 8 schematically illustrates three separate times in the process of crossing a microchannel with an illumination spot according to the methods of the invention.

The methods are depicted further in FIG. 8, which schematically shows laser illumination spot 800 at three separate times in the process of crossing microchannel segment 802 (top view). At time I, illumination spot 800 has not entered microchannel segment 802 and the corresponding fluorescent intensity signal is about zero. At time II, the entire illumination spot 800 is in microchannel segment 802 and the corresponding fluorescent intensity signal is at about maximum intensity. At time III, the entire illumination spot 800 has exited from the opposite side of microchannel segment 802 and the corresponding fluorescent intensity signal has returned to about zero. The distance traveled by illumination spot 800, which corresponds to the width of the detected signal, is equal to the sum of microchannel width 804 and illumination spot diameter 806. As a result, when the width of a microchannel or other distance between two points is known, an illumination spot diameter is optionally determined, e.g., by subtracting the distance between the two points from the detected signal width. Additional examples illustrating this method are provided below. If the width of the illumination spot does not correspond to the distance between the two points, then the method generally further includes focusing or defocusing the illumination spot to correspond to about the distance between the two points, e.g., to minimize the chance of detectable assay components escaping detection.

After the measuring step of the method of measuring a distance between two points (e.g., the width of a microscale cavity or the like), the method includes calculating the distance between the two points from the amount of time, the rate, and the known width of the illumination spot. Specifically, the calculating step typically includes multiplying the rate and the amount of time to yield a detected signal width, and subtracting the width of the illumination spot from the detected signal width. For example, to determine an unknown distance between two points, e.g., one corresponding to the top portion and the other to an opposing bottom portion of a microchannel, if the width of an incident laser illumination spot is 50 μm, and it takes 15 seconds for the spot to move across both points at rate of 10 μm/second, then the detected signal width would be 150 μm (e.g., 15 seconds×10 μm/second). Thus, the distance between the two points (e.g., the height of the microchannel) would be 100 μm (i.e., 150 μm−50 μm).

In another embodiment, the invention provides a method of predicting a detected signal width expected upon detecting a detectable signal created as an illumination spot passes across two points, where a width of the illumination spot and a distance between the two points are known. The method includes summing the width of the illumination spot and the distance between the two points. To illustrate, if a width of an illumination spot is 10 μm and the distance between the two points across which the spot is to be passed (e.g., to produce a detectable signal) is 90 μm, then the expected signal width would be 100 μm.

III. Measurement Systems

The present invention also provides systems for performing, e.g., the method of measuring an illumination spot width or the method of measuring the distance between two points (e.g., a microchannel or other microscale cavity width). As will be understood by practitioners in the art from the teachings provided herein, the invention is optionally implemented in hardware and/or software. In some embodiments, different aspects of the invention are implemented in either client-side logic or server-side logic. As will be understood in the art, the invention or components thereof may be embodied in a media program component (e.g., a fixed media component) containing logic instructions and/or data that, when loaded into an appropriately configured computing device, cause that device to perform according to the invention. As will also be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

In particular, the system includes a computer and system software having one or more logic instructions. The logic instructions direct the system to: (a) receive inputted parameters including a distance between two points and a rate (e.g., for the method of measuring an illumination spot width), or alternatively, a width of the illumination spot and a rate (e.g., for the method of measuring a distance between two points), (b) pass an illumination spot across the two points at the rate, in which a detectable signal is created as the illumination spot is incident across each of the two points, (c) measure an amount of time for the illumination spot to move from a first of the two points to a second of the two points, and (d) calculate the width of the illumination spot from the amount of time, the rate, and the distance between the two points (i.e., for the method of measuring an illumination spot width), or alternatively, calculate a distance between two points from the amount of time, the rate, and the width of the illumination spot (i.e., for the method of measuring a distance between two points).

The system also typically includes an illumination spot source operably connected to the computer for producing the illumination spot and two points (e.g., a microfluidic device having one or more microscale cavities disposed therein) across which the illumination spot is capable of passing at the rate to create the detectable signal. Essentially any known illumination or light source is optionally utilized in practicing the invention, including, e.g., lasers (e.g., optically pumped lasers, gas-discharge, pulsed gas lasers, chemical lasers, photodissociation lasers, gas-dynamic lasers, semiconductor lasers, helium-cadmium lasers, etc.), arc lamps (e.g., 75-W xenon arc lamps, mercury arc lamps, etc.), hydrogen or deuterium discharge lamps, incandescent filament lamps, mercury vapor lamps, xenon flash lamps, combinations thereof, or the like. Illumination sources optionally further include means for directing the light, such as fiber optic cables, or the like. See also, *The Photonics Design and Applications Handbook*, books 1, 2, 3 and 4, published annually by Laurin Publishing Co., Berkshire Common, P.O. Box 1146, Pittsfield, Mass. and Skoog et al., *Principles of Instrumental Analysis*, $5^{th}$ Ed., Harcourt Brace & Co., Philadelphia (1998) for common sources for optical components.

In addition, the system also typically include a detector operably connected to the computer for detecting the detectable signal, and a controller (e.g., a robotic armature or the like) operably connected to the computer, the illumination spot source, and the two points for effecting relative movement of the illumination spot source, the two points, or both. As indicated above, in preferred embodiments, identical or different components of a microscale cavity (e.g., a microchannel, a capillary channel, a microscale reservoir, or the like) of a microfluidic device include the two points. The components typically include, e.g., a side portion, a top portion, a bottom portion, or the like.

Although the devices and systems specifically illustrated herein are generally described in terms of the performance of a few or one particular operation, it will be readily appreciated from this disclosure that the flexibility of these systems permits easy integration of additional operations into these devices. For example, the devices and systems described will optionally include structures, reagents and systems for performing virtually any number of operations both upstream and downstream from the operations specifically described herein. Such upstream operations include sample handling and preparation operations, e.g., particle separation, extraction, purification, amplification, cellular activation, labeling reactions, dilution, aliquotting, and the like. Similarly, downstream operations may include similar operations, such as, e.g., separation of sample components, labeling of components, assays and detection operations, electrokinetic or pressure-based injection of components into contact with particle sets, or materials released from particle sets, or the like.

Assay and detection operations include, without limitation, cell fluorescence assays, cell activity assays, probe interrogation assays, e.g., nucleic acid hybridization assays utilizing individual probes, free or tethered within the channels or chambers of the device and/or probe arrays having large numbers of different, discretely positioned probes, receptor/ligand assays, immunoassays, and the like. Any of these elements are optionally fixed to array members, or fixed, e.g., to channel walls, or the like. An example system is described below.

Instrumentation

The systems described herein generally include microfluidic devices, as described further below, in conjunction with additional instrumentation for measuring illumination spot widths or microscale cavity dimensions, fluid transport, flow rate and direction within the devices, detection instrumentation for detecting or sensing results of the operations performed by the system, processors, e.g., computers, for instructing the controlling instrumentation in accordance with preprogrammed instructions, receiving data from the detection instrumentation, and for analyzing, storing and interpreting the data, and providing the data and interpretations in a readily accessible reporting format.

Controllers

A variety of controlling instrumentation is optionally utilized in conjunction with the microfluidic devices described above, for controlling the transport, concentration, and direction of fluids (e.g., cell-based assay components or the like) and/or materials within the devices of the present invention, e.g., by pressure-based or electrokinetic control.

As described above, in many cases, fluid transport, concentration, and direction are controlled in whole or in part, using pressure based flow systems that incorporate external or internal pressure sources to drive fluid flow. Internal sources include microfabricated pumps, e.g., diaphragm pumps, thermal pumps, and the like that have been described in the art. See, e.g., U.S. Pat. Nos. 5,271,724, 5,277,556, and 5,375,979 and Published PCT Application Nos. WO 94/05414 and WO 97/02357. As also noted above, the systems described herein can also utilize electrokinetic material direction and transport systems. Preferably, external pressure sources are used, and applied to ports at channel termini. These applied pressures, or vacuums, generate pressure differentials across the lengths of channels to drive fluid flow through them. In the interconnected channel networks described herein, differential flow rates on volumes are optionally accomplished by applying different pressures or vacuums at multiple ports, or preferably, by applying a single vacuum at a common waste port and configuring the various channels with appropriate resistance to yield desired flow rates. Example systems are also described in U.S. Ser. No. 09/238,467 filed Jan. 28, 1999.

Typically, the controller systems are appropriately configured to receive or interface with a microfluidic device or system element as described herein. For example, the controller and/or detector, optionally includes a stage upon which the device of the invention is mounted to facilitate appropriate interfacing between the controller and/or detector and the device. Typically, the stage includes an appropriate mounting/alignment structural element, such as a nesting well, alignment pins and/or holes, asymmetric edge structures (to facilitate proper device alignment), and the like. Many such configurations are described in the references cited herein.

The controlling instrumentation discussed above is also used to provide for electrokinetic injection or withdrawal of material downstream of the region of interest to control an upstream flow rate. The same instrumentation and techniques described above are also utilized to inject a fluid into a downstream port to function as a flow control element.

Detector

In preferred embodiments, detector systems of the invention include illumination sources, such as lasers to induce detectable signals (e.g., fluorescent signals, etc.) in assay components. Other suitable illumination sources include, e.g., arc lamps, hydrogen or deuterium discharge lamps, incandescent filament lamps, mercury vapor lamps, xenon flash lamps, combinations thereof, or the like. As described herein, the methods of the invention are typically utilized to optimize assays (e.g., cell-based assays or the like) performed in microfluidic devices by adjusting the widths of incident illumination spots to correspond with microscale cavity widths at points of detection.

The devices herein typically include signal detectors, e.g., which detect light emission, changes in light emission, absorbance, changes in absorbance, fluorescence, changes in fluorescence, phosphorescence, changes in phosphorescence, luminescence, changes in luminescence, temperature, changes in temperature, concentration, radioactivity, pH, charge, refractive index, magnetism, mass, or the like. The detector(s) optionally monitor(s) one or a plurality of signals from upstream and/or downstream of an assay mixing point in which, e.g., a ligand and an enzyme are mixed. For example, the detector optionally monitors a plurality of optical signals, which correspond in position to "real time" assay results.

Example detectors or sensors include emission spectroscopes, absorption spectroscopes, fluorescence spectroscopes, phosphorescence spectroscopes, luminescence spectroscopes, spectrophotometers, photometers, thermal detection devices, thermometers, photomultiplier tubes, CCD arrays, optical sensors, temperature sensors, pressure sensors, pH sensors, conductivity sensors, mass sensors, scanning detectors, or the like. Cells or other components which emit a detectable signal are optionally flowed past the detector, or, alternatively, the detector can move relative to the array to determine the position of an assay component (or, the detector can simultaneously monitor a number of spatial positions corresponding to channel regions, e.g., as in a CCD array). Each of these types of sensors is optionally readily incorporated into the microfluidic systems described herein. In these systems, such detectors are placed either within or adjacent to the microfluidic device or one or more channels, chambers or conduits of the device, such that the detector is within sensory communication with the device, channel, or chamber. The phrase "within sensory communication" of a particular region or element, as used herein, generally refers to the placement of the detector in a position such that the detector is capable of detecting the property of the microfluidic device, a portion of the microfluidic device, or the contents of a portion of the microfluidic device, for which that detector was intended. The detector optionally includes or is operably linked to a computer, e.g., which has software for converting detector signal information into assay result information, or the like. A microfluidic system optionally employs multiple different detection systems for monitoring the output of the system. Detection systems of the present invention are used to detect and monitor the materials in a particular channel region (or other reaction detection region).

The detector optionally exists as a separate unit, but is preferably integrated with the controller system, into a single instrument. Integration of these functions into a single unit facilitates connection of these instruments with the computer (described below), by permitting the use of few or a single communication port(s) for transmitting information between the controller, the detector and the computer.

Computer

As noted above, either or both of the controller system and/or the detection system is/are optionally coupled to an appropriately programmed processor or computer which functions to instruct the operation of these instruments in accordance with preprogrammed or user input instructions, receive data and information from these instruments, and interpret, manipulate and report this information to the user. As such, the computer is typically appropriately coupled to one or both of these instruments (e.g., including an analog to digital or digital to analog converter as needed).

The computer typically includes appropriate software for receiving user instructions, either in the form of user input into a set parameter fields, e.g., in a GUI, or in the form of preprogrammed instructions, e.g., preprogrammed for a variety of different specific operations. The software then converts these instructions to appropriate language for instructing the operation of the fluid direction and transport controller to carry out the desired operation. The computer then receives the data from the one or more sensors/detectors included within the system, and interprets the data, either provides it in a user understood format, or uses that data to initiate further controller instructions, in accordance with the programming, e.g., such as in monitoring and control of flow rates, temperatures, applied voltages, and the like.

IV. Software Products

The present invention also relates to software products that include computer readable media having computer programs stored thereon for causing a computer to measure a width of an illumination spot or to measure a distance between two points. The computer programs include: a logic instruction for causing the computer to receive one or more inputted parameters including a distance between two points (e.g., for the method of measuring a width of an illumination spot), or alternatively, a width of an illumination spot (e.g., for the method of measuring a distance between two points); a logic instruction for causing the computer to effect emission of the illumination spot from an illumination spot source; a logic instruction for causing the computer to effect movement of the illumination spot relative to the two points, to effect movement of the two points relative to the illumination spot, or both; a logic instruction for causing the computer to vary or select a rate or a mode of moving the illumination spot relative to the two points, to vary or select a rate or a mode of moving the two points relative to the illumination spot, or both; a logic instruction for causing the computer to record or store a detected signal; a logic instruction for causing the computer to measure an amount of time for the illumination spot to pass across the two points; and a logic instruction for causing the computer to calculate the width of the illumination spot from the amount of time, the rate, and the distance between the two points, or alternatively, a logic instruction for causing the computer to calculate the distance between the two points from the amount of time, the rate, and the width of the illumination spot. For the method of measuring the width of an illumination spot, the software product also typically includes a logic instruction for causing the computer to effect focusing or defocusing of the illumination spot upon calculating the width of the illumination spot such that the focused or defocused illumination spot corresponds to about the distance between the two points. For example, the computer readable medium optionally includes, e.g., a CD-ROM, a floppy disk, a tape, a flash memory device or component, a system memory device or component, a hard drive, or a data signal embodied in a carrier wave.

Figure 1:
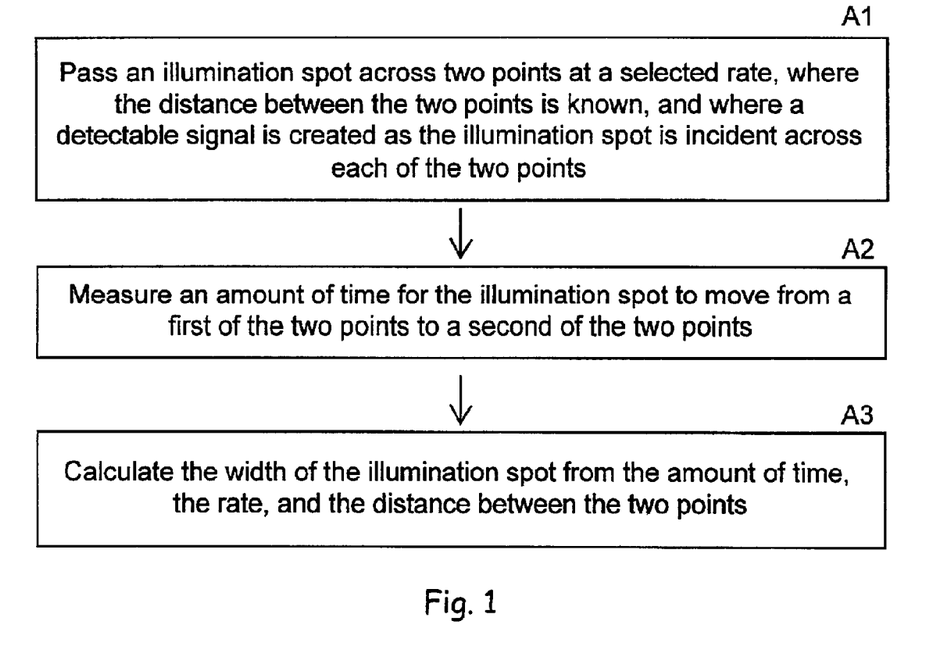
FIG. 1 is a flow chart that schematically shows steps involved in the method of the invention for measuring the width of an illumination spot.

FIG. 1 is a flow chart that further schematically shows steps involved in the method for measuring the width of an illumination spot that is optionally performed under the direction of the software product of the invention. As shown, the method includes A1, passing an illumination spot across two points at a selected rate, where the distance between the two points is known, and where a detectable signal is created as the illumination spot is incident across each of the two points. Following A1, the method includes A2, measuring an amount of time for the illumination spot to move from a first of the two points to a second of the two points. The method also includes A3, calculating the width of the illumination spot from the amount of time, the rate, and the distance between the two points.

Figure 2:
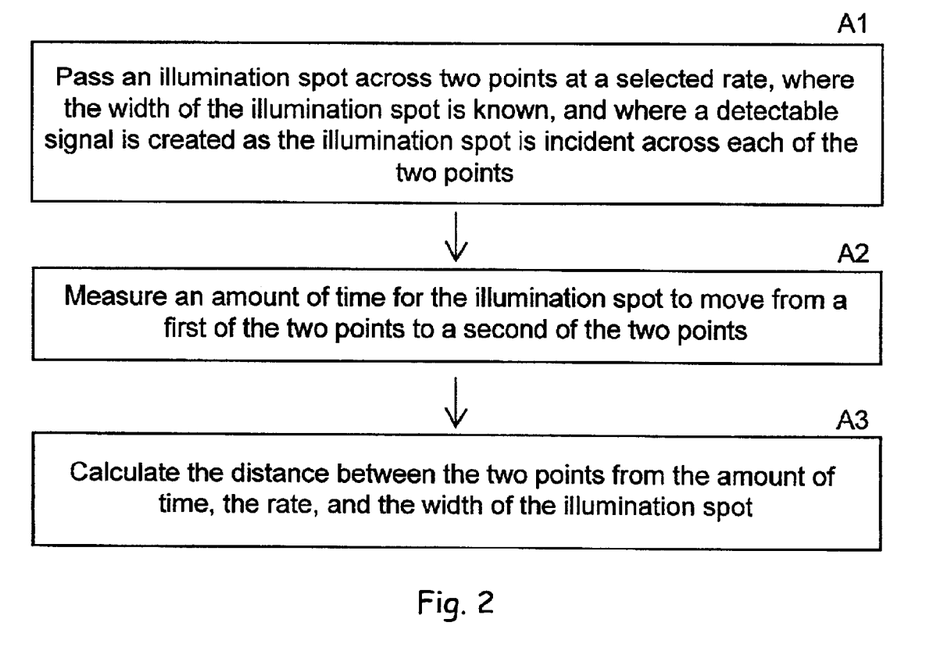
FIG. 2 is a flow chart that schematically shows steps involved in the method of the invention for measuring the distance between two points.

FIG. 2 is a flow chart that further schematically shows steps involved in the method for measuring the distance between two points that is optionally performed under the direction of the software product of the invention. As shown, the method includes A1, passing an illumination spot across two points at a selected rate, where the width of the illumination spot is known, and where a detectable signal is created as the illumination spot is incident across each of the two points. Following A1, the method includes A2, measuring an amount of time for the illumination spot to move from a first of the two points to a second of the two points. The method also includes A3, calculating the distance between the two points from the amount of time, the rate, and the width of the illumination spot.

V. Microfluidic Devices

A variety of microscale systems are optionally adapted for use in the methods of the present invention for measuring illumination spot widths and for measuring distances between two points, such as points on components of microscale cavities, as discussed herein. These systems are described in various PCT applications and issued U.S. Patents by the inventors and their coworkers, including U.S. Pat. No. 5,699,157 (J. Wallace Parce) issued Dec. 16, 1997, U.S. Pat. No. 5,779,868 (J. Wallace Parce et al.) issued Jul. 14, 1998, U.S. Pat. No. 5,800,690 (Calvin Y. H. Chow et al.) issued Sep. 1, 1998, U.S. Pat. No. 5,842,787 (Anne R. Kopf-Sill et al.) issued Dec. 1, 1998, U.S. Pat. No. 5,852,495

(J. Wallace Parce) issued Dec. 22, 1998, U.S. Pat. No. 5,869,004 (J. Wallace Parce et al.) issued Feb. 9, 1999, U.S. Pat. No. 5,876,675 (Colin B. Kennedy) issued Mar. 2, 1999, U.S. Pat. No. 5,880,071 (J. Wallace Parce et al.) issued Mar. 9, 1999, U.S. Pat. No. 5,882,465 (Richard J. McReynolds) issued Mar. 16, 1999, U.S. Pat. No. 5,885,470 (J. Wallace Parce et al.) issued Mar. 23, 1999, U.S. Pat. No. 5,942,443 (J. Wallace Parce et al.) issued Aug. 24, 1999, U.S. Pat. No. 5,948,227 (Robert S. Dubrow) issued Sep. 7, 1999, U.S. Pat. No. 5,955,028 (Calvin Y. H. Chow) issued Sep. 21, 1999, U.S. Pat. No. 5,957,579 (Anne R. Kopf-Sill et al.) issued Sep. 28, 1999, U.S. Pat. No. 5,958,203 (J. Wallace Parce et al.) issued Sep. 28, 1999, U.S. Pat. No. 5,958,694 (Theo T. Nikiforov) issued Sep. 28, 1999, U.S. Pat. No. 5,959,291 (Morten J. Jensen) issued Sep. 28, 1999, U.S. Pat. No. 5,964,995 (Theo T. Nikiforov et al.) issued Oct. 12, 1999, U.S. Pat. No. 5,965,001 (Calvin Y. H. Chow et al.) issued Oct. 12, 1999, U.S. Pat. No. 5,965,410 (Calvin Y. H. Chow et al.) issued Oct. 12, 1999, U.S. Pat. No. 5,972,187 (J. Wallace Parce et al.) issued Oct. 26, 1999, U.S. Pat. No. 5,976,336 (Robert S. Dubrow et al.) issued Nov. 2, 1999, U.S. Pat. No. 5,989,402 (Calvin Y. H. Chow et al.) issued Nov. 23, 1999, U.S. Pat. No. 6,001,231 (Anne R. Kopf-Sill) issued Dec. 14, 1999, U.S. Pat. No. 6,011,252 (Morten J. Jensen) issued Jan. 4, 2000, U.S. Pat. No. 6,012,902 (J. Wallace Parce) issued Jan. 11, 2000, U.S. Pat. No. 6,042,709 (J. Wallace Parce et al.) issued Mar. 28, 2000, U.S. Pat. No. 6,042,710 (Robert S. Dubrow) issued Mar. 28, 2000, U.S. Pat. No. 6,046,056 (J. Wallace Parce et al.) issued Apr. 4, 2000, U.S. Pat. No. 6,048,498 (Colin B. Kennedy) issued Apr. 11, 2000, U.S. Pat. No. 6,068,752 (Robert S. Dubrow et al.) issued May 30, 2000, U.S. Pat. No. 6,071,478 (Calvin Y. H. Chow) issued Jun. 6, 2000, U.S. Pat. No. 6,074,725 (Colin B. Kennedy) issued Jun. 13, 2000, U.S. Pat. No. 6,080,295 (J. Wallace Parce et al.) issued Jun. 27, 2000, U.S. Pat. No. 6,086,740 (Colin B. Kennedy) issued Jul. 11, 2000, U.S. Pat. No. 6,086,825 (Steven A. Sundberg et al.) issued Jul. 11, 2000, U.S. Pat. No. 6,090,251 (Steven A. Sundberg et al.) issued Jul. 18, 2000, U.S. Pat. No. 6,100,541 (Robert Nagle et al.) issued Aug. 8, 2000, U.S. Pat. No. 6,107,044 (Theo T. Nikiforov) issued Aug. 22, 2000, U.S. Pat. No. 6,123,798 (Khushroo Gandhi et al.) issued Sep. 26, 2000, U.S. Pat. No. 6,129,826 (Theo T. Nikiforov et al.) issued Oct. 10, 2000, U.S. Pat. No. 6,132,685 (Joseph E. Kersco et al.) issued Oct. 17, 2000, U.S. Pat. No. 6,148,508 (Jeffrey A. Wolk) issued Nov. 21, 2000, U.S. Pat. No. 6,149,787 (Andrea W. Chow et al.) issued Nov. 21, 2000, U.S. Pat. No. 6,149,870 (J. Wallace Parce et al.) issued Nov. 21, 2000, U.S. Pat. No. 6,150,119 (Anne R. Kopf-Sill et al.) issued Nov. 21, 2000, U.S. Pat. No. 6,150,180 (J. Wallace Parce et al.) issued Nov. 21, 2000, U.S. Pat. No. 6,153,073 (Robert S. Dubrow et al.) issued Nov. 28, 2000, U.S. Pat. No. 6,156,181 (J. Wallace Parce et al.) issued Dec. 5, 2000, U.S. Pat. No. 6,167,910 (Calvin Y. H. Chow) issued Jan. 2, 2001, U.S. Pat. No. 6,171,067 (J. Wallace Parce) issued Jan. 9, 2001, U.S. Pat. No. 6,171,850 (Robert Nagle et al.) issued Jan. 9, 2001, U.S. Pat. No. 6,172,353 (Morten J. Jensen) issued Jan. 9, 2001, U.S. Pat. No. 6,174,675 (Calvin Y. H. Chow et al.) issued Jan. 16, 2001, U.S. Pat. No. 6,182,733 (Richard J. McReynolds) issued Feb. 6, 2001, and U.S. Pat. No. 6,186,660 (Anne R. Kopf-Sill et al.) issued Feb. 13, 2001; and published PCT applications, such as, WO 98/00231, WO 98/00705, WO 98/00707, WO 98/02728, WO 98/05424, WO 98/22811, WO 98/45481, WO 98/45929, WO 98/46438, and WO 98/49548, WO 98/55852, WO 98/56505, WO 98/56956, WO 99/00649, WO 99/10735, WO 99/12016, WO 99/16162, WO 99/19056, WO 99/19516, WO 99/29497, WO 99/31495, WO 99/34205, WO 99/43432, WO 99/44217, WO 99/56954, WO 99/64836, WO 99/64840, WO 99/64848, WO 99/67639, WO 00/07026, WO 00/09753, WO 00/10015, WO 00/21666, WO 00/22424, WO 00/26657, WO 00/42212, WO 00/43766, WO 00/45172, WO 00/46594, WO 00/50172, WO 00/50642, WO 00/58719, WO 00/060108, WO 00/070080, WO 00/070353, WO 00/072016, WO 00/73799, WO 00/078454, and WO 00/102850.

The methods of the invention are generally performed within fluidic channels along which assay components, such as cells or other materials are disposed and/or flowed. In some cases, the channels are simply present in a capillary channel or tube, e.g., a glass, fused silica, quartz or plastic capillary. The capillary channel is fluidly coupled to a source of, e.g., the sample, reagent, or other material, which is then flowed along the capillary channel. In particularly preferred aspects, the channel is integrated into the body structure of a microfluidic device. As used herein, the term "microfluidic" generally refers to one or more fluid passages, chambers or conduits which have at least one internal cross-sectional dimension, e.g., depth, width, length, diameter, etc., that is less than 500 μm, and typically between about 0.1 μm and about 500 μm.

In the devices of the present invention, the microscale channels or cavities preferably have at least one cross-sectional dimension between about 0.1 μm and 200 μm, more preferably between about 0.1 μm and 100 μm, and often between about 0.1 μm and 50 μm. Accordingly, the microfluidic devices or systems prepared in accordance with the present invention typically include at least one microscale channel (i.e., microchannel), usually at least two intersecting microscale channels, and often, three or more intersecting channels disposed within a single body structure. Channel intersections may exist in a number of formats, including cross intersections, "Y" or "T" intersections, or any number of other structures whereby two channels are in fluid communication.

The body structure of the microfluidic devices described herein typically comprises an aggregation of two or more separate layers which when appropriately mated or joined together, form the microfluidic device of the invention, e.g., containing the channels and/or chambers described herein. Typically, the microfluidic devices described herein will comprise a top portion, a bottom portion, and an interior portion, wherein the interior portion substantially defines the channels and chambers of the device.

In preferred aspects, the bottom portion of the device comprises a solid substrate that is substantially planar in structure, and which has at least one substantially flat upper surface. A variety of substrate materials are optionally employed as the bottom portion. Typically, because the devices are microfabricated, substrate materials will be selected based upon their compatibility with known microfabrication techniques, e.g., photolithography, wet chemical etching, laser ablation, air abrasion techniques, LIGA, reactive ion etching, injection molding, embossing, and other techniques. The substrate materials are also generally selected for their compatibility with the full range of conditions to which the microfluidic devices may be exposed, including extremes of pH, temperature, electrolyte concentration, and application of electric fields. Accordingly, in some preferred aspects, the substrate material may include materials normally associated with the semiconductor industry in which such microfabrication techniques are regularly employed, including, e.g., silica-based substrates, such as glass, quartz, silicon or polysilicon, as well as other substrate materials, such as gallium arsenide and the like. In the case of semiconductive materials, it will often be desirable to provide an insulating coating or layer, e.g., silicon oxide, over the substrate material, and particularly in those applications where electric fields are to be applied to the device or its contents.

In additional preferred aspects, the substrate materials will comprise polymeric materials, e.g., plastics, such as polymethylmethacrylate (PMMA), polycarbonate, polytetrafluoroethylene (TEFLON™), polyvinylchloride (PVC), polydimethylsiloxane (PDMS), polysulfone, polystyrene, polymethylpentene, polypropylene, polyethylene, polyvinylidine fluoride, ABS (acrylonitrile-butadiene-styrene copolymer), and the like. Such polymeric substrates are readily manufactured using available microfabrication techniques, as described above, or from microfabricated masters, using well-known molding techniques, such as injection molding, embossing or stamping, or by polymerizing the polymeric precursor material within the mold (See U.S. Pat. No. 5,512,131). Such polymeric substrate materials are preferred for their ease of manufacture, low cost and disposability, as well as their general inertness to most extreme reaction conditions. Again, these polymeric materials may include treated surfaces, e.g., derivatized or coated surfaces, to enhance their utility in the microfluidic system, e.g., to provide enhanced fluid direction, e.g., as described in U.S. Pat. No. 5,885,470 (J. Wallace Parce et al.) issued Mar. 23, 1999, and which is incorporated herein by reference in its entirety for all purposes.

The channels and/or cavities of the microfluidic devices are typically fabricated into the upper surface of the bottom substrate or portion of the device, as microscale grooves or indentations, using the above described microfabrication techniques. The top portion or substrate also comprises a first planar surface, and a second surface opposite the first planar surface. In the microfluidic devices prepared in accordance with certain aspects of the methods described herein, the top portion also includes a plurality of apertures, holes or ports disposed therethrough, e.g., from the first planar surface to the second surface opposite the first planar surface.

The first planar surface of the top substrate is then mated, e.g., placed into contact with, and bonded to the planar surface of the bottom substrate, covering and sealing the grooves and/or indentations in the surface of the bottom substrate, to form the channels and/or chambers (i.e., the interior portion) of the device at the interface of these two components. Bonding of substrates is typically carried out by any of a number of different methods, e.g., thermal bonding, solvent bonding, ultrasonic welding, and the like.

The holes in the top portion of the device are oriented such that they are in communication with at least one of the channels and/or cavities formed in the interior portion of the device from the grooves or indentations in the bottom substrate. In the completed device, these holes function as reservoirs for facilitating fluid or material introduction into the channels or chambers of the interior portion of the device, as well as providing ports at which electrodes can optionally be placed into contact with fluids within the device, allowing application of electric fields along the channels of the device to control and direct fluid transport within the device. In many embodiments, extensions are provided over these reservoirs to allow for increased fluid volumes, permitting longer running assays, and better controlling fluid flow parameters, e.g., hydrostatic pressures. Examples of methods and apparatuses for providing such extensions are described in U.S. application Ser. No. 09/028,965, filed Feb. 24, 1998, and incorporated herein by reference.

VI. Flow of Reagents in Microscale Systems

The flowing of samples, reagents, and other materials along the microchannels of the devices described herein is optionally carried out by a number of mechanisms, including pressure-based flow, electrokinetic flow, or mechanisms that utilize a hybrid of the two. In a preferred aspect, a pressure differential is used to flow the materials along, e.g., a capillary channel, a side channel, an analysis channel, or the like. Application of a pressure differential along the channel is carried out by a number of means. For example, in a simple passive aspect, the reagents are deposited in a reservoir or well at one end of an analysis channel and at a sufficient volume or depth, that the reagent sample creates a hydrostatic pressure differential along the length of the analysis channel, e.g., by virtue of its having greater depth than a reservoir at an opposite terminus of the channel. The hydrostatic pressure then causes the reagents to flow along the length of the channel. Typically, the reservoir volume is quite large in comparison to the volume or flow through rate of the channel, e.g., 10 $\mu$l reservoirs, vs. 1000 $\mu m^2$ channel cross-section. As such, over the time course of the assay, the flow rate of the reagents will remain substantially constant, as the volume of the reservoir, and thus, the hydrostatic pressure changes very slowly. Applied pressure is then readily varied to yield different reagent flow rates through the channel. In screening applications, varying the flow rate of the reagents is optionally used to vary the incubation time of the reagents. In particular, by slowing the flow rate along the channel, one can effectively lengthen the amount of time between introduction of reagents and detection of a particular effect. Alternatively, analysis channel lengths, detection points, or reagent introduction points are varied in fabrication of the devices, to vary incubation times.

In many applications, it may be desirable to provide relatively precise control of the flow rate of the samples and/or other materials, e.g., to precisely control incubation or separation times, etc. As such, in many preferred aspects, flow systems that are more active than hydrostatic pressure driven systems are employed. For example, reagents may be flowed by applying a pressure differential across the length of the analysis channel. For example, a pressure source (positive or negative) is applied at the reagent reservoir at one end of the analysis channel, and the applied pressure forces the reagents through the channel. The pressure source is optionally pneumatic, e.g., a pressurized gas, or a positive displacement mechanism, i.e., a plunger fitted into a reagent reservoir, for forcing the reagents through the analysis channel. Alternatively, a vacuum source is applied to a reservoir at the opposite end of the channel to draw the reagents through the channel. Pressure or vacuum sources may be supplied external to the device or system, e.g., external vacuum or pressure pumps sealably fitted to the inlet or outlet of the analysis channel, or they may be internal to the device, e.g., microfabricated pumps integrated into the device and operably linked to the analysis channel. Examples of microfabricated pumps have been widely described in the art. See, e.g., published International Application No. WO 97/02357.

In alternate aspects, other flow systems are employed in transporting reagents through the analysis channel. One example of such alternate methods employs electrokinetic forces to transport the reagents. Electrokinetic transport systems typically utilize electric fields applied along the length of channels that have a surface potential or charge associated therewith. When fluid is introduced into the channel, the charged groups on the inner surface of the channel ionize, creating locally concentrated levels of ions near the fluid surface interface. Under an electric field, this charged sheath migrates toward the cathode or anode (depending upon whether the sheath comprises positive or negative ions) and pulls the encompassed fluid along with it, resulting in bulk fluid flow. This flow of fluid is generally termed electroosmotic flow. Where the fluid includes reagents, the reagents are also pulled along. A more detailed description of controlled electrokinetic material transport systems in microfluidic systems is described in published International Patent Application No. WO 96/04547, which is incorporated herein by reference.

Hydrostatic, wicking and capillary forces are also optionally used to provide for fluid flow. See, e.g., "Method and Apparatus for Continuous Liquid Flow in Microscale Channels Using Pressure Injection, Wicking and Electrokinetic Injection," by Alajoki et al., U.S. Ser. No. 09/245,627, filed Feb. 5, 1999. In these methods, an adsorbent material or branched capillary structure is placed in fluidic contact with a region where pressure is applied, thereby causing fluid to move towards the adsorbent material or branched capillary structure.

In alternative aspects, flow of reagents is driven by centrifugal forces. In particular, the analysis channel is optionally disposed in a substrate that has the conformation of a rotor, with the analysis channel extending radially outward from the center of the rotor. The reagents are deposited in a reservoir that is located at the interior portion of the rotor and is fluidly connected to the channel. During rotation of the rotor, the centripetal force on the reagents forces the reagents through the analysis channel, outward toward the edge of the rotor. Multiple analysis channels are optionally provided in the rotor to perform multiple different analyses. Detection of a detectable signal produced by the reagents is then carried out by placing a detector under the spinning rotor and detecting the signal as the analysis channel passes over the detector. Examples of rotor systems have been previously described for performing a number of different assay types. See, e.g., Published International Application No. WO 95/02189. Test compound reservoirs are optionally provided in the rotor, in fluid communication with the analysis channel, such that the rotation of the rotor also forces the test compounds into the analysis channel.

For purposes of illustration the discussion has focused on a single channel and accessing capillary, however, it will be readily appreciated that these aspects may be provided as multiple parallel analysis channels and accessing capillaries, in order to substantially increase the throughput of the system. Specifically, single body structures may be provided with multiple parallel analysis channels coupled to multiple sample accessing capillaries that are positioned to sample multiple samples at a time from sample libraries, e.g., multiwell plates. As such, these capillaries are generally spaced at regular distances that correspond with the spacing of wells in multiwell plates, e.g., 9 mm centers for 96 well plates, 4.5 mm for 384 well plates, and 2.25 mm for 1536 well plates.

VII. Kits

Generally, the microfluidic devices described herein are optionally packaged to include reagents for performing the device's preferred function and/or software for measuring illumination spot widths, e.g., to optimize assay detection as described herein. For example, the kits can include any of microfluidic devices described along with assay components, reagents, sample materials, proteins, antibodies, enzymes, substrates, control materials, spacers, buffers, immiscible fluids, or the like. Such kits also typically include appropriate instructions for using the devices and reagents, and in cases where reagents are not predisposed in the devices themselves, with appropriate instructions for introducing the reagents into the channels and/or chambers of the device. In this latter case, these kits optionally include special ancillary devices for introducing materials into the microfluidic systems, e.g., appropriately configured syringes/pumps, or the like (in one embodiment, the device itself comprises a pipettor element, such as an electropipettor for introducing material into channels and chambers within the device). In the former case, such kits typically include a microfluidic device with necessary reagents predisposed in the channels/chambers of the device. Kits also typically include appropriate instructions for operating the software of the invention.

Generally, reagents are provided in a stabilized form, so as to prevent degradation or other loss during prolonged storage, e.g., from leakage. A number of stabilizing processes are widely used for reagents that are to be stored, such as the inclusion of chemical stabilizers (i.e., enzymatic inhibitors, microcides/bacteriostats, anticoagulants), the physical stabilization of the material, e.g., through immobilization on a solid support, entrapment in a matrix (i.e., a gel), lyophilization, or the like. Kits also optionally include packaging materials or containers for holding microfluidic device, software, system, and/or reagent elements.

EXAMPLES

I. Example

Focusing Procedure

Figure 3:
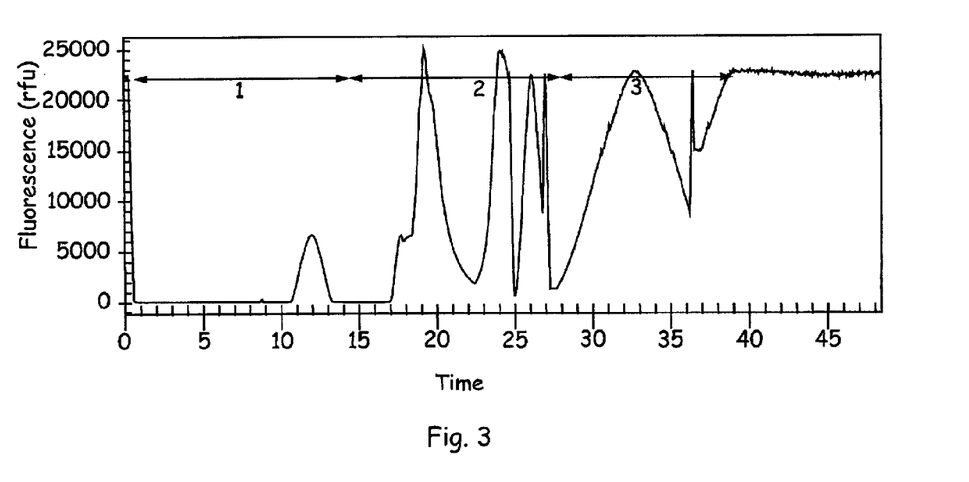
FIG. 3 is graph of the signal intensity obtained during a three-dimensional laser focusing sequence.

FIG. 3 is graph of the signal intensity obtained during a three-dimensional laser focusing sequence using a microfluidic device in a system of the invention. The sequence is optionally used to measure laser illumination spot widths according to the methods described herein. Optionally, the sequence is utilized after each interchange of a microfluidic device in the system. As shown, the focusing sequence is broken down into three steps. During step 1, horizontal focusing (i.e., perpendicular to the microscale cavity) is performed, followed by vertical focusing in step 2. Step 3 includes a second horizontal focusing. As shown, during step 3, after the signal returns to background, the laser slowly moves horizontally across the cavity until the signal reaches a peak (i.e., the wide peak in step 3). Shortly thereafter, the laser goes back at high speed (i.e., the sharp peak in step 3) and then forward again to reach the maximal signal (i.e., the final plateau).

It is generally assumed that the signal exceeds background when the front edge of the laser illumination spot reaches the cavity, and that the signal will return to background level when the spot completely passes the cavity. The full width of the corresponding peak, therefore, should be equal to the width of the cavity plus the diameter of the laser illumination spot. Since the full width of the peak is not on the graph (step 3), it is assumed that the peak is symmetrical and in turn, that the full width of the peak may be extrapolated. Optionally, the laser focusing sequence is modified such that the full width of the wide peak of step 3 is observed experimentally by: (a) moving the laser illumination spot far off the cavity horizontally (e.g., after the vertical focusing step, i.e. step 2), so the signal goes all the way to background, and then (b) allowing the spot to cross the cavity completely and continue until the signal returns to background.

Note, that when the laser was defocused too much, a background level was not registered between steps 2 and 3. In this case, the spot was probably too close to the cavity at the start of step 3, so it was not possible to calculate the width of the peak. However, this information, by itself, indicated that laser should be refocused, since for optimized detection the laser illumination spot should not exceed the width of the cavity.

II. Example

Laser Not Defocused

Figure 4:
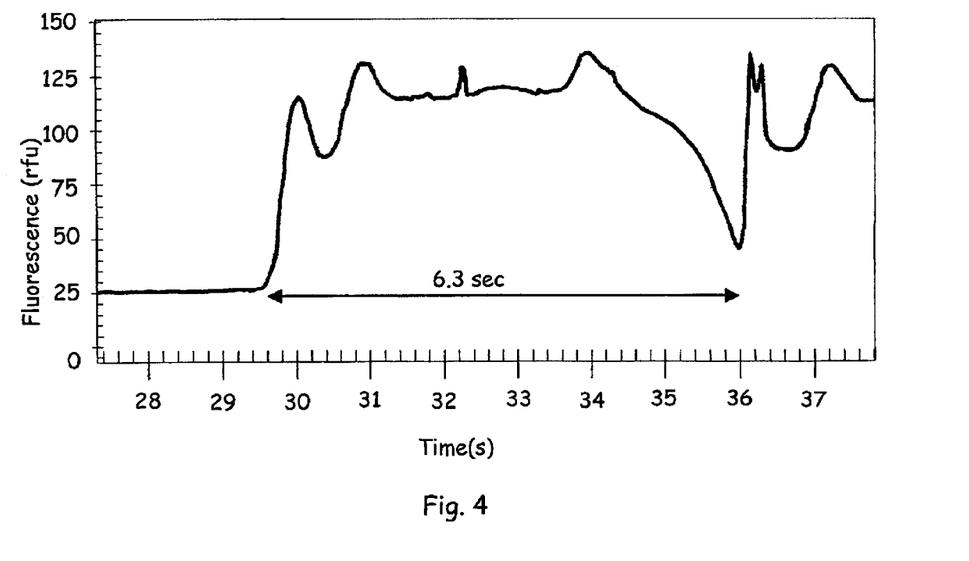
FIG. 4 is graph of the signal intensity obtained as a red laser, that had not been defocused, crossed a microchannel with Cy5™ dye flowing therethrough.

FIG. 4 is graph of a signal intensity obtained as a red laser, that had not been defocused, crossed a microchannel with Cy5™ dye flowing therethrough. According to manufacturer specifications, the laser illumination spot, that had not been defocused, should have been about 10–12 $\mu$m in diameter. As shown, the width of the peak is 6.3 seconds. The rate of illumination spot movement was 16 $\mu$m/second (i.e., the step motor velocity). As a result, the detected signal width is about 101 $\mu$m (i.e., 6.3 seconds×16 $\mu$m/second). The width of the microchannel was 90 $\mu$m. Thus, the calculated laser illumination spot size derived according to the methods described herein was 11 $\mu$m (i.e., 101 $\mu$m−90 $\mu$m), which is consistent with the specified diameter.

III. Example

Defocused Laser

Figure 5:
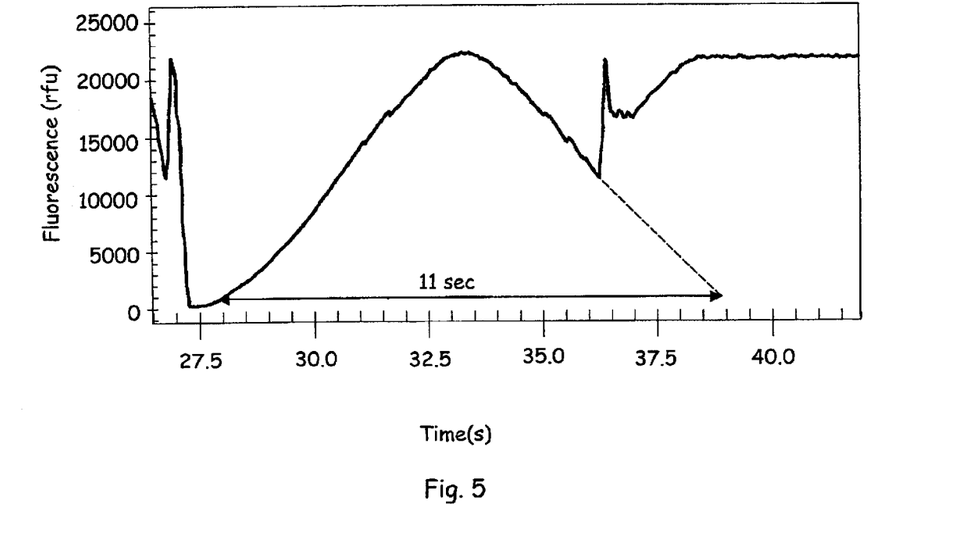
FIG. 5 is graph of the signal intensity obtained as a defocused blue laser crossed a microchannel with FITC dye flowing therethrough.

FIG. 5 is graph of a signal intensity obtained as a defocused blue laser crossed a microchannel with FITC dye flowing therethrough. As shown, the width of the peak is 11 seconds. The rate of illumination spot movement was 16 $\mu$m/second (i.e., the step motor velocity). As a result, the detected signal width is about 176 $\mu$m (i.e., 11 seconds×16 $\mu$m/second). The width of the microchannel was 90 $\mu$m. Thus, the calculated laser illumination spot size derived according to the methods of the invention was 86 $\mu$m (i.e., 176 $\mu$m−90 $\mu$m). Unlike Example II, the peak does not have plateau, which is consistent with the laser spot being close to the size of the microchannel. Multiple measurements of laser illumination spot diameter on one instrument using different microchannel locations and various microfluidic devices produced similar results, with CV<5%.

IV. Example

System

Figure 6A:
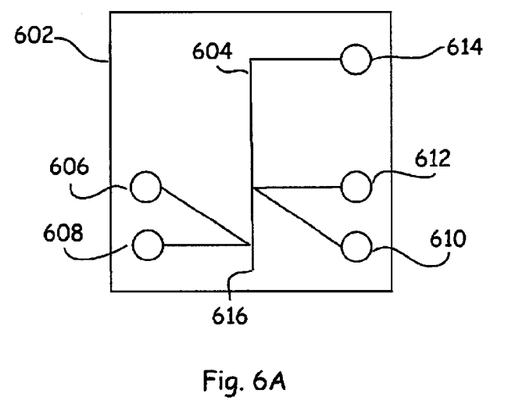
FIGS. 6A-6C schematically show a microfluidic device that includes a capillary element from various viewpoints.
Figure 6B:
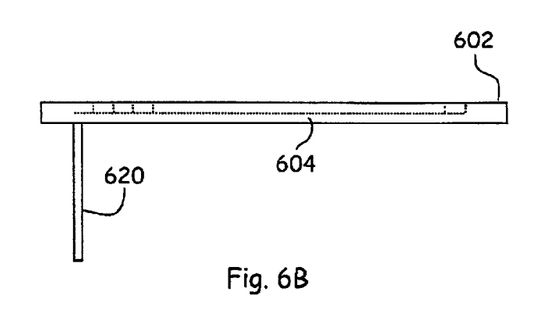
Figure 6C:
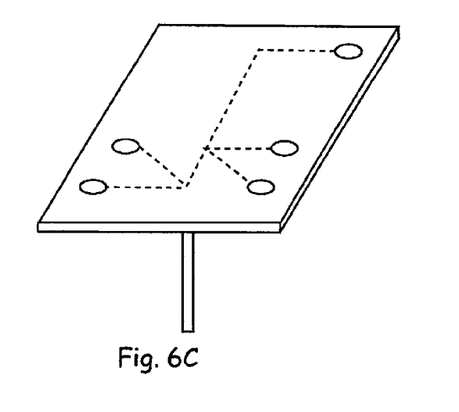
Figure 7:
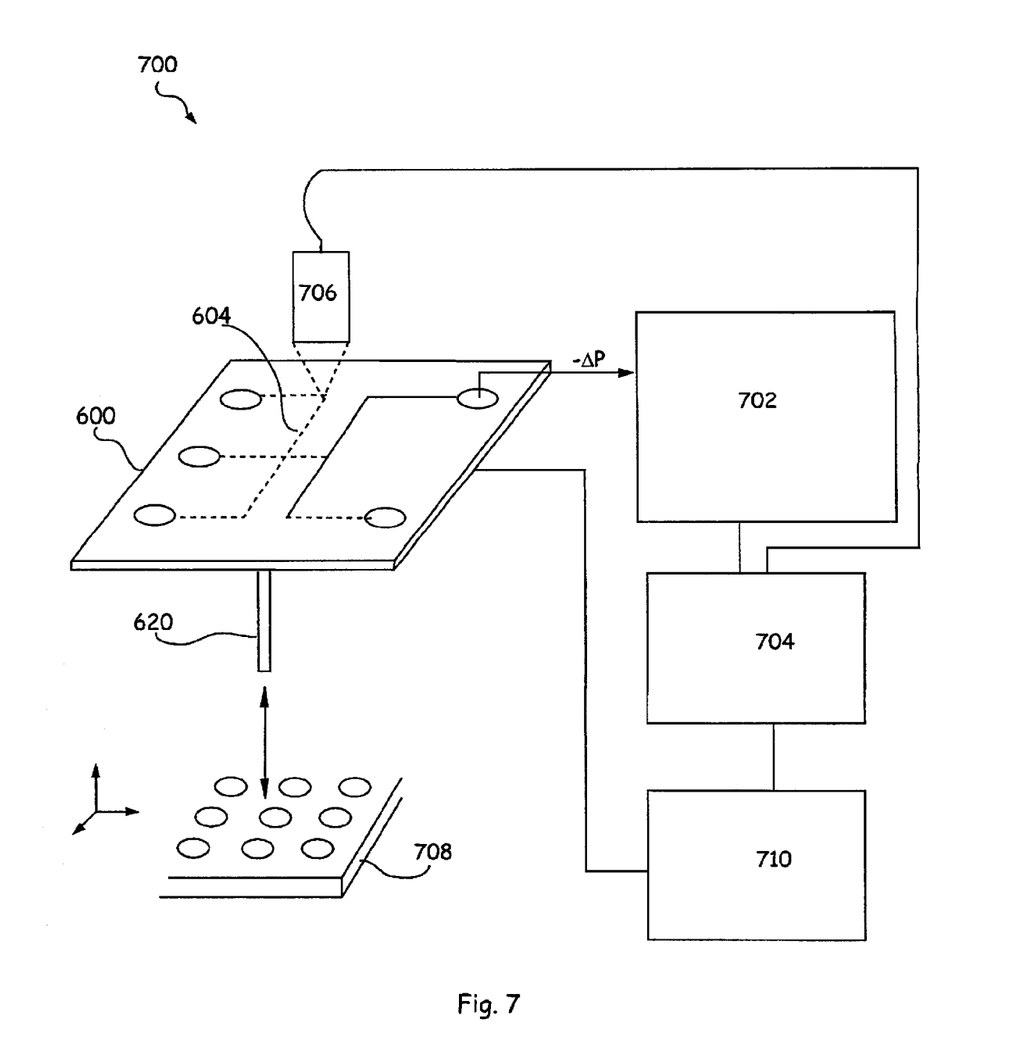
FIG. 7 schematically illustrates a system that includes the microfluidic device of FIGS. 6A-6C.

FIG. 6, Panels A, B, and C and FIG. 7 provide additional details regarding example integrated systems that are optionally used to practice the methods herein. As shown, body structure 602 of microfluidic device 600 has main microchannel 604 disposed therein. Cells, reagents, dyes, and/or other materials are optionally flowed from pipettor or capillary element 620 towards reservoir 614, e.g., by applying a vacuum at reservoir 614 (or another point in the system) and/or by applying appropriate voltage gradients. Alternatively, a vacuum is applied at reservoirs 608, 612 or through pipettor or capillary element 620. Additional materials are optionally flowed from wells 608 or 612 and into main microchannel 604. Flow from these wells is optionally performed by modulating fluid pressure, or by electrokinetic approaches as described (or both). As fluid is added to main microchannel 604, e.g., from reservoir 608, the flow rate increases. The flow rate is optionally reduced by flowing a portion of the fluid from main microchannel 604 into flow reduction microchannel 606 or 610. The arrangement of channels depicted in FIG. 6 is only one possible arrangement out of many which are appropriate and available for use in the present invention. Additional alternatives can be devised, e.g., by combining the microfluidic elements described herein with other microfluidic device components described in the patents and applications referenced herein.

Samples or other materials are optionally flowed from the enumerated wells or from a source external to the body structure. As depicted, the integrated system optionally includes pipettor or capillary element 620, e.g., protruding from body 602, for accessing a source of materials external to the microfluidic system. Typically, the external source is a microtiter dish, a substrate, a membrane, or other convenient storage medium. For example, as depicted in FIG. 7, pipettor or capillary element 620 can access microwell plate 708, which includes sample materials, dyes, buffers, substrate solutions, enzyme solutions, or the like, in the wells of the plate.

Detector 706 is in sensory communication with main microchannel 604, detecting signals resulting, e.g., from labeled materials flowing through the detection region. Detector 706 is optionally coupled to any of the channels or regions of the device where detection is desired. Detector 706 is operably linked to computer 704, which digitizes, stores, and manipulates signal information detected by detector 706, e.g., using any logic instruction, e.g., for measuring laser illumination spot widths, for measuring cavity dimensions, for determining concentration, molecular weight or identity, or the like.

Fluid direction system 702 controls pressure, voltage, or both, e.g., at the wells of the system or through the channels or other cavities of the system, or at vacuum couplings fluidly coupled to main microchannel 604 or other channels described above. Optionally, as depicted, computer 704 controls fluid direction system 702. In one set of embodiments, computer 704 uses signal information to select further parameters for the microfluidic system. For example, upon detecting the presence of a component of interest (e.g., following separation) in a sample from microwell plate 708, the computer optionally directs addition of a potential modulator of the component of interest into the system. In certain embodiments, controller 710 dispenses aliquots of selected material into, e.g., main microchannel 604. In these embodiments, controller 710 is also typically operably connected to computer 704, which directs controller 710 function.

Although not shown, a microfluidic device handling system is also optionally included in the integrated systems of the present invention. Microfluidic device handling systems generally control, e.g., the X-Y-Z translation of microfluidic device 600 relative to microwell plate 708, of microwell plate 708 relative to microfluidic device 600, or of other system components, under the direction of computer 704, e.g., according to appropriate program instructions, to which device handling systems are typically operably connected.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above may be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes.

What is claimed is:

1. A method of measuring a width of an illumination spot, comprising:
   passing the illumination spot across two points at a rate, where a distance between the two points is known, and wherein a detectable signal is created as the illumination spot is incident across each of the two points;
   measuring an amount of time for the illumination spot to move from a first of the two points to a second of the two points; and,
   calculating the width of the illumination spot from the amount of time, the rate, and the known distance between the two points.

2. The method of claim 1, wherein the illumination spot passes manually or robotically across the two points.

3. The method of claim 1, wherein an illumination spot source is positioned at about a fixed distance from the two points during the passing step.

4. The method of claim 1, wherein a laser generates the illumination spot.

5. The method of claim 1, wherein the rate comprises at least about 1 $\mu$m/second, at least about 5 $\mu$m/second, at least about 10 $\mu$m/second, at least about 15 $\mu$m/second, at least about 20 $\mu$m/second, at least about 25 $\mu$m/second, at least about 50 $\mu$m/second, or faster.

6. The method of claim 1, wherein the distance between the two points comprises at least about 0.1 $\mu$m, at least about 1 $\mu$m, at least about 10 $\mu$m, at least about 15 $\mu$m, at least about 20 $\mu$m, at least about 25 $\mu$m, at least about 50 $\mu$m, at least about 100 $\mu$m, at least about 250 $\mu$m, at least about 500 $\mu$m, at least about 1000 $\mu$m, or more.

7. The method of claim 1, wherein the amount of time comprises a period during which the detectable signal exceeds a background signal as the illumination spot passes across the two points.

8. The method of claim 1, wherein the calculating step comprises multiplying the rate and the amount of time to yield a detected signal width, and subtracting the distance between the two points from the detected signal width.

9. The method of claim 1, further comprising focusing or defocusing the illumination spot upon measuring the width of the illumination spot to correspond to about the distance between the two points.

10. The method of claim 9, wherein the focused or defocused illumination spot thereby optimizes detection of an assay performed in a microfluidic device.

11. The method of claim 1, wherein identical or different components of at least one microscale cavity comprise the two points.

12. The method of claim 11, wherein a microfluidic device comprises the at least one microscale cavity.

13. The method of claim 11, wherein the components comprise one or more of: a side portion, a top portion, or a bottom portion.

14. The method of claim 11, wherein the at least one microscale cavity comprises a microchannel, a capillary channel, or a microscale reservoir.

15. The method of claim 1, wherein the measuring step comprises detecting the detectable signal and determining the amount of time from the detected signal.

16. The method of claim 15, wherein the detecting step further comprises excluding a background signal produced in an absence of the illumination spot.

17. The method of claim 15, wherein the detectable signal comprises a light emission, a change in light emission, in absorbance, a change in absorbance, a fluorescence, a change in fluorescence, a phosphorescence, a change in phosphorescence, a luminescence, a change in luminescence, a temperature, or a change in temperature.

18. The method of claim 15, wherein the determining step further comprises extrapolating at least a portion of the amount of time from the detected signal.

19. A system comprising a computer and system software having one or more logic instructions which direct the system to:
   (a) receive one or more inputted parameters comprising a distance between two points and a rate;
   (b) pass an illumination spot across the two points at the rate, wherein a detectable signal is created as the illumination spot is incident across each of the two points;
   (c) measure an amount of time for the illumination spot to move from a first of the two points to a second of the two points; and,
   (d) calculate the width of the illumination spot from the amount of time, the rate, and the distance between the two points.

20. The system of claim 19, further comprising:
   an illumination spot source operably connected to the computer for producing the illumination spot;
   two points across which the illumination spot is capable of passing at the rate to create the detectable signal;
   a detector operably connected to the computer for detecting the detectable signal; and,
   a controller operably connected to the computer, the illumination spot source, and the two points for effecting relative movement of the illumination spot source, the two points, or both.

21. The system of claim 19, wherein the illumination spot source comprises a laser.

22. The system of claim 19, wherein the detectable signal comprises a light emission, a change in light emission, an absorbance, a change in absorbance, a fluorescence, a change in fluorescence, a phosphorescence, a change in phosphorescence, a luminescence, a change in luminescence, a temperature, or a change in temperature.

23. The system of claim 20, wherein the detector comprises one or more of: an emission spectroscope, an absorption spectroscope, a fluorescence spectroscope, a phosphorescence spectroscope, a luminescence spectroscope, a spectrophotometer, a photometer, a thermal detection device, or a thermometer.

24. The system of claim 20, wherein the controller comprises a robotic armature.

25. The system of claim 20, wherein identical or different components of at least one microscale cavity comprise at least one of the two points.

26. The system of claim 25, wherein a microfluidic device comprises the at least one microscale cavity.

27. The system of claim 25, wherein the components comprise one or more of: a side portion, a top portion, or a bottom portion.

28. The system of claim 25, wherein the at least one microscale cavity comprises a microchannel, a capillary channel, or a microscale reservoir.

29. A software product comprising a computer readable medium having a computer program stored thereon for causing a computer to measure a width of an illumination spot, the computer program comprising:
   at least one logic instruction for causing the computer to receive one or more inputted parameters comprising a distance between two points;

at least one logic instruction for causing the computer to effect emission of the illumination spot from an illumination spot source;

at least one logic instruction for causing the computer to effect movement of the illumination spot relative to the two points, to effect movement of the two points relative to the illumination spot, or both;

at least one logic instruction for causing the computer to vary or select a rate or a mode of moving the illumination spot relative to the two points, to vary or select a rate or a mode of moving the two points relative to the illumination spot, or both;

at least one logic instruction for causing the computer to record or store a detected signal;

at least one logic instruction for causing the computer to measure an amount of time for the illumination spot to pass across the two points; and, at least one logic instruction for causing the computer to calculate the width of the illumination spot from the amount of time, the rate, and the distance between the two points.

30. The software product of claim 29, further comprising:

at least one logic instruction for causing the computer to effect focusing or defocusing of the illumination spot upon calculating the width of the illumination spot such that the focused or defocused illumination spot corresponds to about the distance between the two points.

31. The software product of claim 29, wherein the at least one computer readable medium comprises one or more of: a CD-ROM, a floppy disk, a tape, a flash memory device or component, a system memory device or component, a hard drive, or a data signal embodied in a carrier wave.

* * * * *